United States Patent [19]
Meche et al.

[11] Patent Number: 5,148,548
[45] Date of Patent: Sep. 15, 1992

[54] METHOD OF MONITORING CELLULAR RADIO CHANNELS TO AVOID ADJACENT AND CO-CHANNEL INTERFERENCE

[75] Inventors: Paul S. Meche, Richardson; Eugenie M. Chaplain, Plano, both of

[73] Assignee: Northern Telecom Limited, Montreal, Canada

[21] Appl. No.: 452,341

[22] Filed: Dec. 19, 1989

[51] Int. Cl.$^5$ .................. H04Q 7/00; H04B 15/00
[52] U.S. Cl. ...................... 455/34.1; 455/62; 455/63; 455/296; 455/67.3; 379/59
[58] Field of Search ...................... 455/33–34, 455/62–63, 67, 295–296, 50; 379/59, 63; 375/58

[56] References Cited
U.S. PATENT DOCUMENTS

| | | | |
|---|---|---|---|
| 4,555,806 | 11/1985 | Lange et al. | 455/62 |
| 4,597,104 | 6/1986 | Ohki et al. | 455/62 |
| 4,723,303 | 2/1988 | Koch | 455/67 |
| 4,736,453 | 4/1988 | Schloemer | 455/62 |
| 4,794,635 | 12/1988 | Hess | 379/63 |
| 4,810,960 | 3/1989 | Owen et al. | 455/67 |
| 4,965,849 | 10/1990 | Kunihiro | 455/63 |

*Primary Examiner*—Reinhard J. Eisenzopf
*Assistant Examiner*—Andrew Faile
*Attorney, Agent, or Firm*—Foley & Lardner

[57] ABSTRACT

A method to enhance the quality of cellular radio service is disclosed. Only those channels that have a reduced likelihood of co-channel or adjacent channel interference are allocated. This technique, in addition, allows information to be provided to the operating company of drawbacks with the currently engineered RF environment. In particular, the base station will scan for RSSI readings on its channel and channels adjacent to it. If a RSSI measurement above a predetermined threshold is detected, it is assumed that the base station is intercepting a signal from a mobile that is presently being served by another voice channel on an adjacent cell. If this base station were selected to process a call, it may interfere with the call that is already in progress on the current channel or a call that is in progress on an adjacent channel. The base station will inform the controller when it detects a RSSI reading above the predefined threshold indicating that the possibility for co-channel and adjacent interference exists. It will also inform the controller when the detected RSSI reading has gone back below the predefined threshold indicating that the possibility for co-channel and adjacent interference has ceased. If an idle voice channel reports the possibility of co-channel or adjacent interference, it will not be chosen to process a call until all other voice channels that are not reporting interference are in use. When the voice channel reports that the possibility for co-channel or adjacent channel interference has ceased, it will be returned to its normal priority level to be selected to process a call.

5 Claims, 7 Drawing Sheets

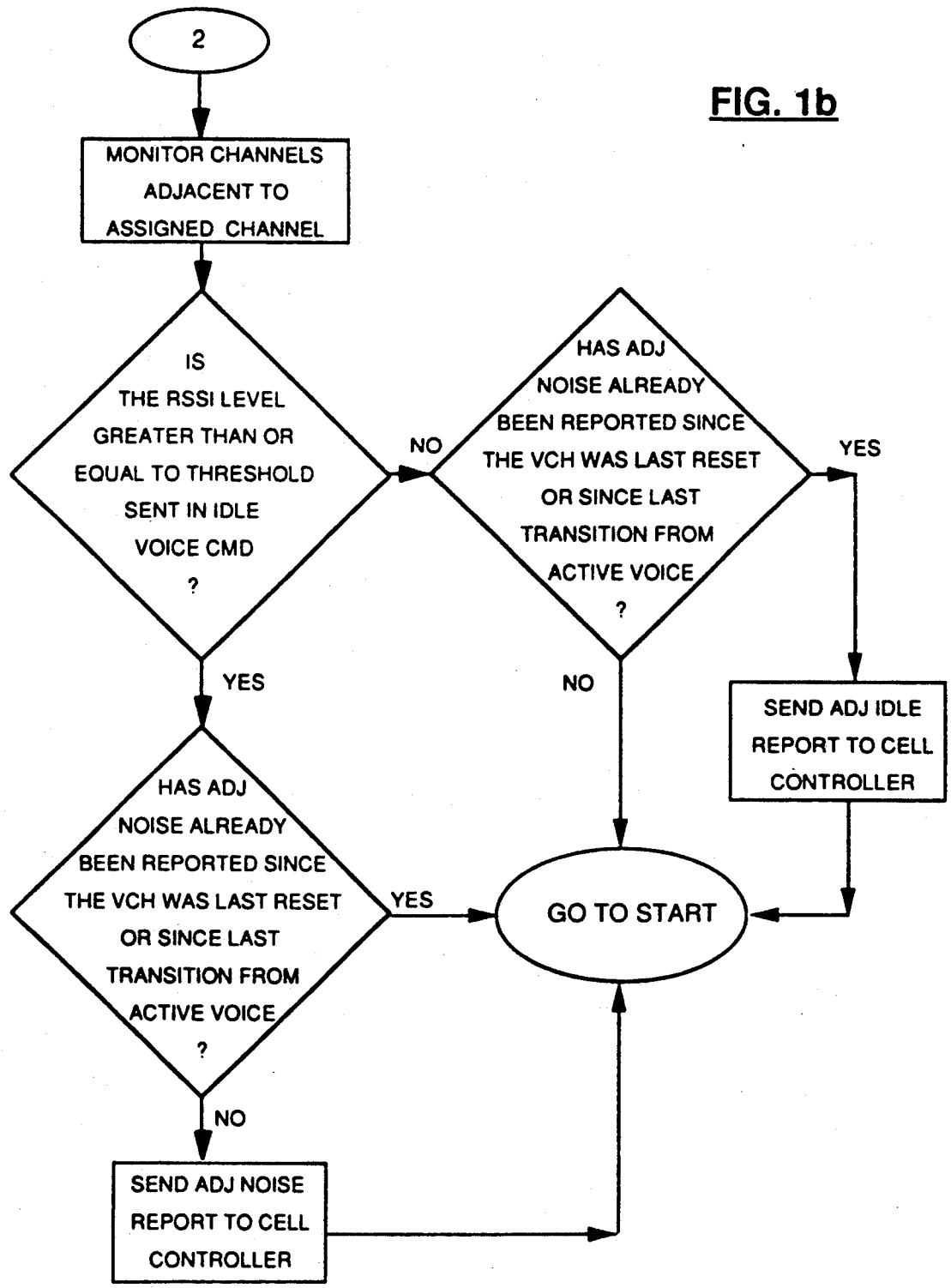

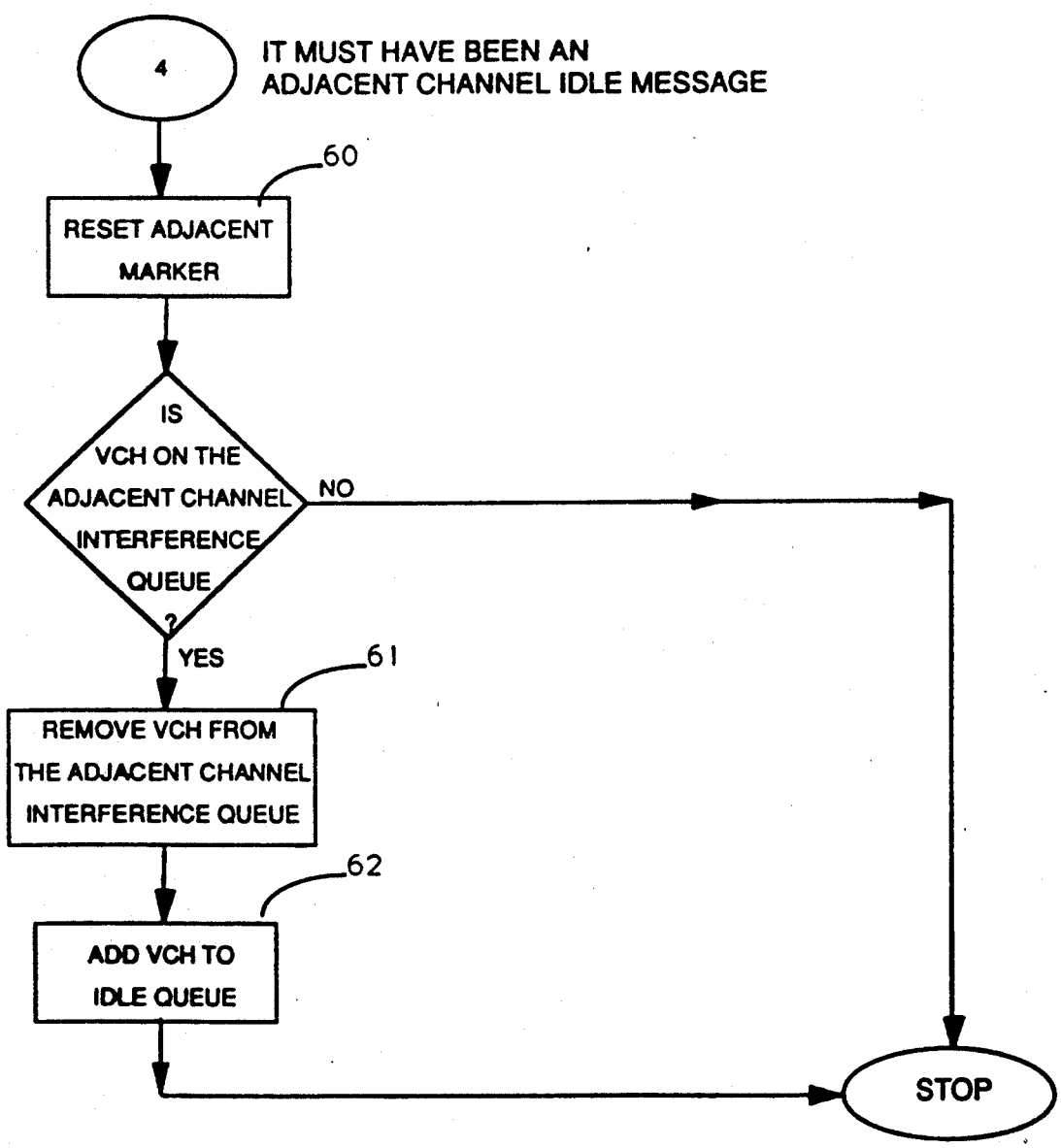

METHOD OF MONITORING CELLULAR RADIO CHANNELS TO AVOID ADJACENT AND CO-CHANNEL INTERFERENCE

FIELD OF THE INVENTION

This invention relates to mobile cellular systems, and more particularly to the avoidance of co-channel and adjacent channel interference.

BACKGROUND OF THE INVENTION

A cellular radio signal is commonly affected by two types of interference: co-channel interference and adjacent channel interference. In the case of co-channel interference, interference is caused on a communication channel by a transmitter operating in the same frequency. Whereas, adjacent channel interference is caused when the extraneous power originating from a first assigned channel spills over into an adjacent channel. The effects of co-channel and adjacent channel interference are two important constraints upon system performance where frequency re-use is important. Although filters are used to reduce interference, narrow or tighter filters are generally more expensive. There is accordingly a need for a method of reducing the effects of co-channel and adjacent channel interference on a cellular system.

SUMMARY OF THE INVENTION

The present invention is a method which is used to enhance the quality of service by allocating only those channels that have a reduced likelihood of co-channel or adjacent channel interference. This technique, in addition, allows information to be provided to the operating company of drawbacks with the currently engineered RF environment. With the present invention, a base station will scan for the presence of signals on its assigned voice channels channels which are idle. It will also periodically scan for the presence of a signal on channels adjacent to it. If a signal is present and is measured to be above a predetermined threshold, RSSI level, it is an indication that the base station is intercepting a signal from a mobile that is presently being served by another voice channel in the system. If this idle voice channel assigned to that base station were selected to process a call, it may interfere with the call that is already in progress on the serving channel or a call that is in progress on an adjacent channel. The base station will inform the controller when it detects a signal having an RSSI reading above the predefined threshold indicating that the possibility for co-channel and/or adjacent channel interference exists. It will also inform the controller when the detected RSSI reading has gone back below the predefined threshold indicating that the possibility for co-channel and/or adjacent channel interference on that idle voice channel has ceased. This information will be factored into the channel allocation algorithm in the cell controller. If a base station reports that there is the possibility of co-channel or adjacent channel interference on an idle voice channel, it will not be chosen to process a call until all other voice channels that are not reporting interference are in use. When the base station reports that the possibility for co-channel or adjacent channel interference on that idle voice channel has ceased, it will be returned to its normal priority level to be selected to process a call. Since co-channel interference causes more serious degradation of the signal than adjacent channel interference, idle voice channels reporting the possibility of adjacent channel interference will be selected before those reporting the possibility of co-channel interference. Each time a base station reports the possibility of interference on a predetermined voice channel, the cell controller can increment the corresponding operational measurement. These operational measurements can be checked by the operating company periodically to determine how their system is performing. If these are high, the operating company can consider the re-engineering of the RF environment.

BRIEF DESCRIPTION OF THE DRAWINGS

FIGS. 1a and 1b are flowcharts illustrating the monitoring algorithms for an assigned channel and its adjacent channels;

FIGS. 2a to 2d are flowcharts illustrating the channel processing algorithms of the cell controller.

DESCRIPTION OF THE INVENTION

Figure 1A:
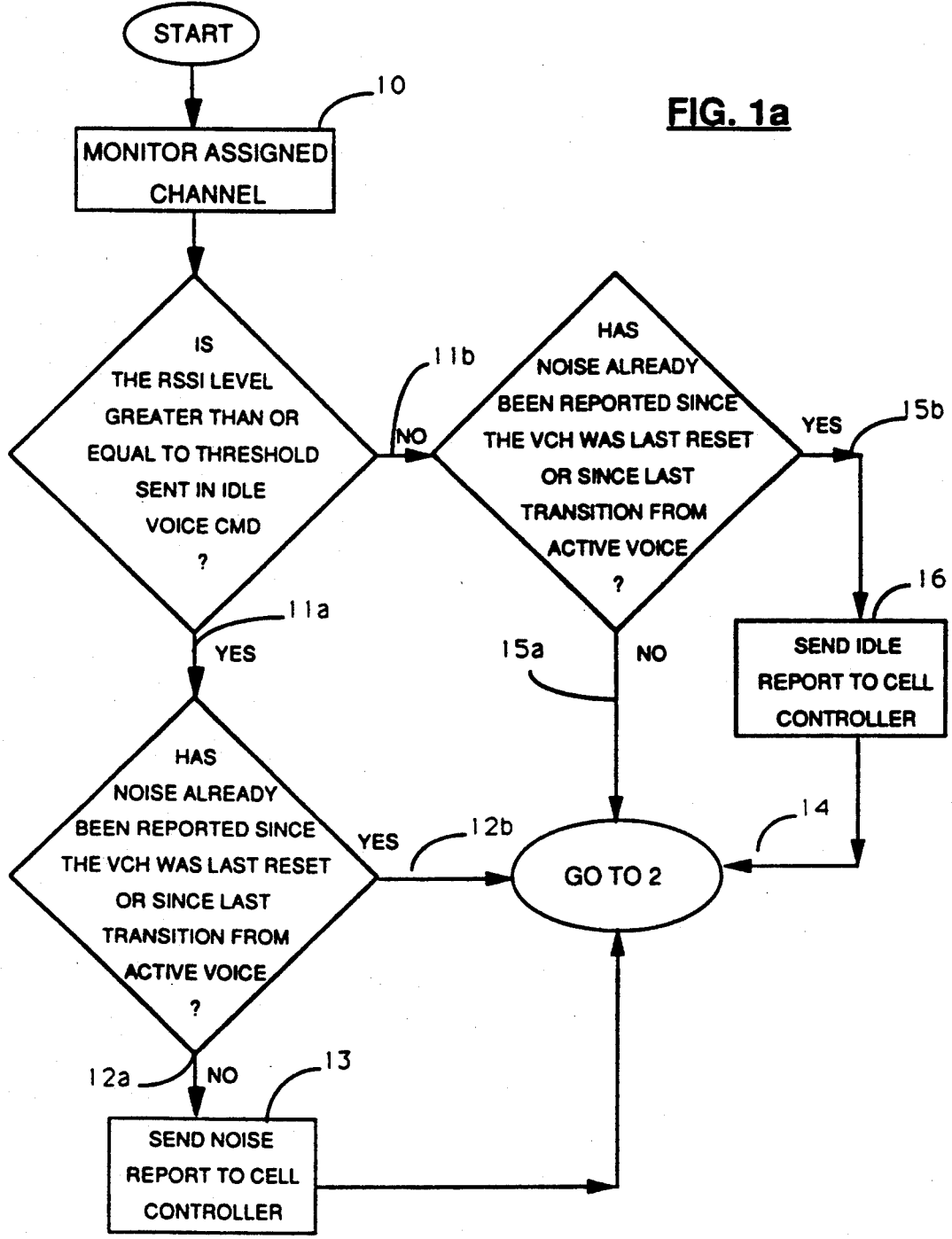

As shown in FIGS. 1a and 1b, base stations having a voice channel (VCH) in idle state, will be directed 10 to scan the frequencies of its assigned idle voice channels, as shown in FIG. 1a, and the frequencies of directly adjacent voice channels, as shown FIG. 1b, to identify the possibility of co-channel and adjacent channel interference respectively, if the idle voice channel is allocated to a user or requester. The RSSI reading for that channel is compared to a predetermined threshold.

a) If the reading is greater than or equal to that threshold 11a, and if a noise report has not previously been sent 12a for that channel, then a noise report 13 is sent to the cell controller;

b) If the reading is greater than or equal to that threshold 11a, and if a noise report has already been reported 12b, then the base station will scan channels 14 adjacent thereof;

c) If the reading is less than the threshold 11b, and if a noise report has not previously been reported 14a, then the VCH will scan 14 channels adjacent thereof; and d) If the reading is less than the threshold 11b, and if a noise report has already been reported 15b, then an idle report is sent 16 to the cell controller.

Adjacent channels are scanned as described above and as shown in FIG. 1b.

Figure 2A:
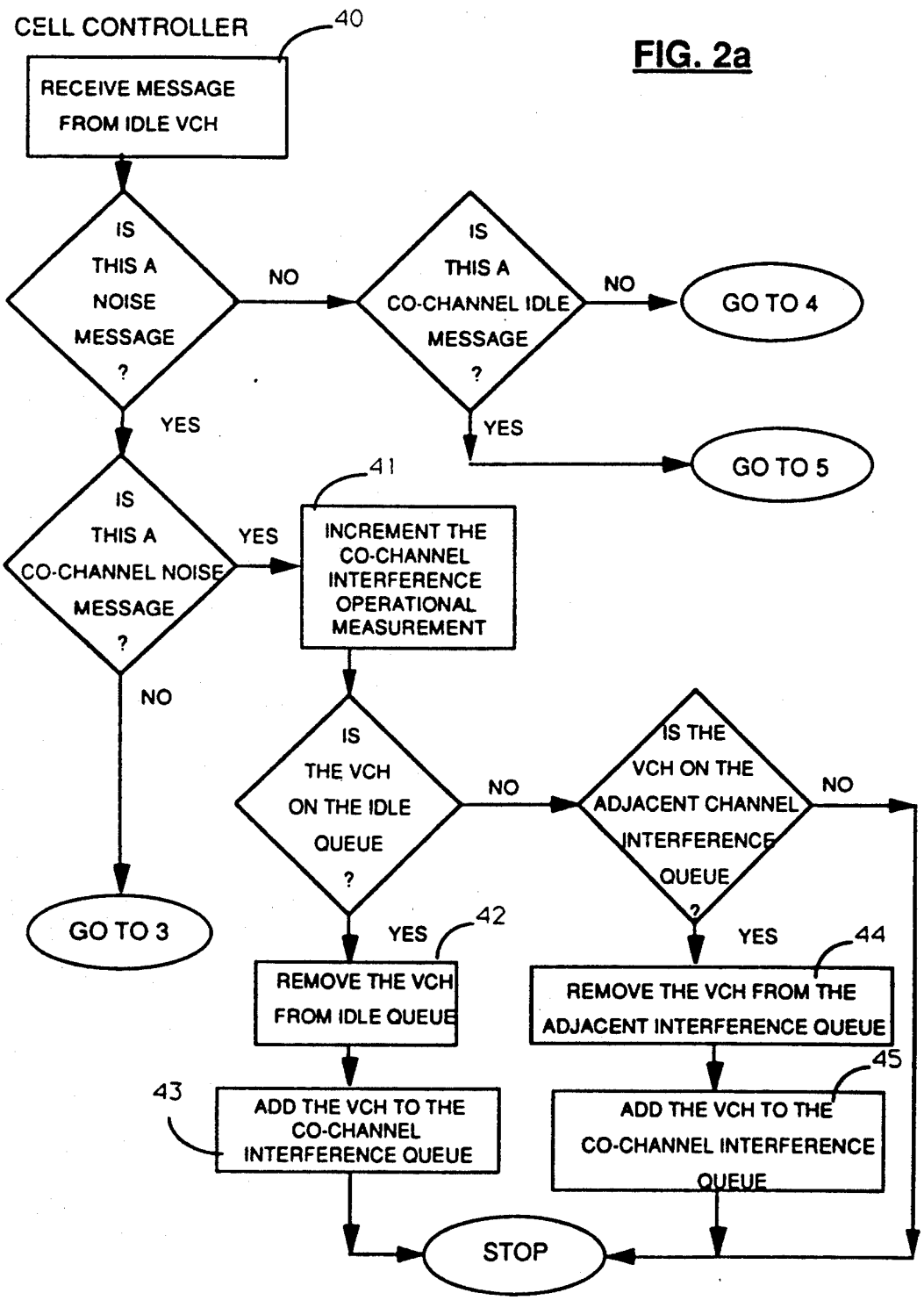

At the cell controller 40, FIG. 2a, incoming messages are monitored to determine whether the message is one of the following:

1) noise message:
   a) from a co-channel (FIG. 2a); or
   b) from an adjacent channel (FIG. 2b);
2) an idle message:
   a) from a co-channel (FIG. 2d); or
   b) from an adjacent channel (FIG. 2c).

When the received message is a noise message from a base station with an assigned idle voice channel (FIG. 2a), i.e. indicating the possibility of co-channel interference, then an operational measurement is incremented 41. From these, the operating company can periodically verify the system's performance.

A voice channel, when not allocated to a user, can be in:

a) an idle queue waiting to be allocated to a user;

b) a co-channel interference queue, until the RSSI reading decreases below the specified threshold for the assigned channel; or c) an adjacent channel interference queue, until the RSSI reading for that adjacent channel decreases below the specified threshold.

In FIG. 2a, if the voice channel is stored in an idle queue, it is removed from the idle queue 42 and added 43 to an interference queue. This way, this channel will not be selected until all other channels are in use, (see FIG. 3) since it is likely to create co-channel interference. The specified channel will remain in the co-channel interference queue until the RSSI reading decreases below the threshold. If the voice channel is held on the adjacent channel interference queue, it is removed 44 from that queue and added 45 to the co-channel interference queue.

Figure 2B:
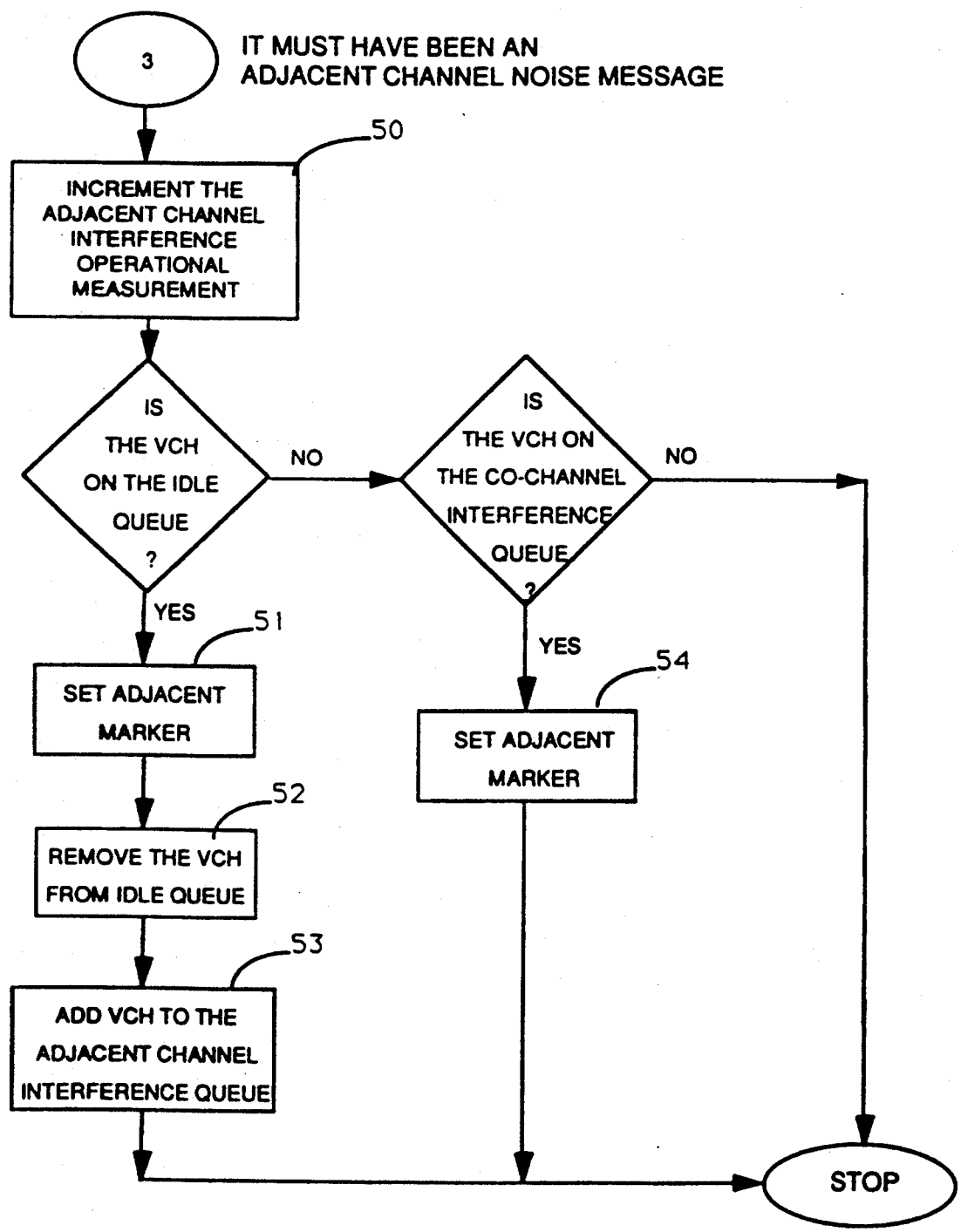

In FIG. 2b, an operational measurement is also incremented 50 when an adjacent noise message is received. If the voice channel is stored in the idle queue, an adjacent marker is set 51, the voice channel is removed 52 from the idle queue and it is added 53 to the adjacent channel interference queue. This voice channel will remain in the adjacent channel interference queue until the RSSI reading decreases below the threshold. If the voice channel is in the co-channel interference queue, an adjacent marker is set 54.

When an idle message is received, it indicates that the voice channel has an RSSI reading below the specified threshold and is being stored in an interference queue. In FIG. 2c, when an adjacent channel idle message is received, the adjacent marker is reset 60 and if the voice channel is on the adjacent channel interference queue, it is removed 61 from the adjacent channel interference queue and added 62 to the idle queue.

Figure 2D:
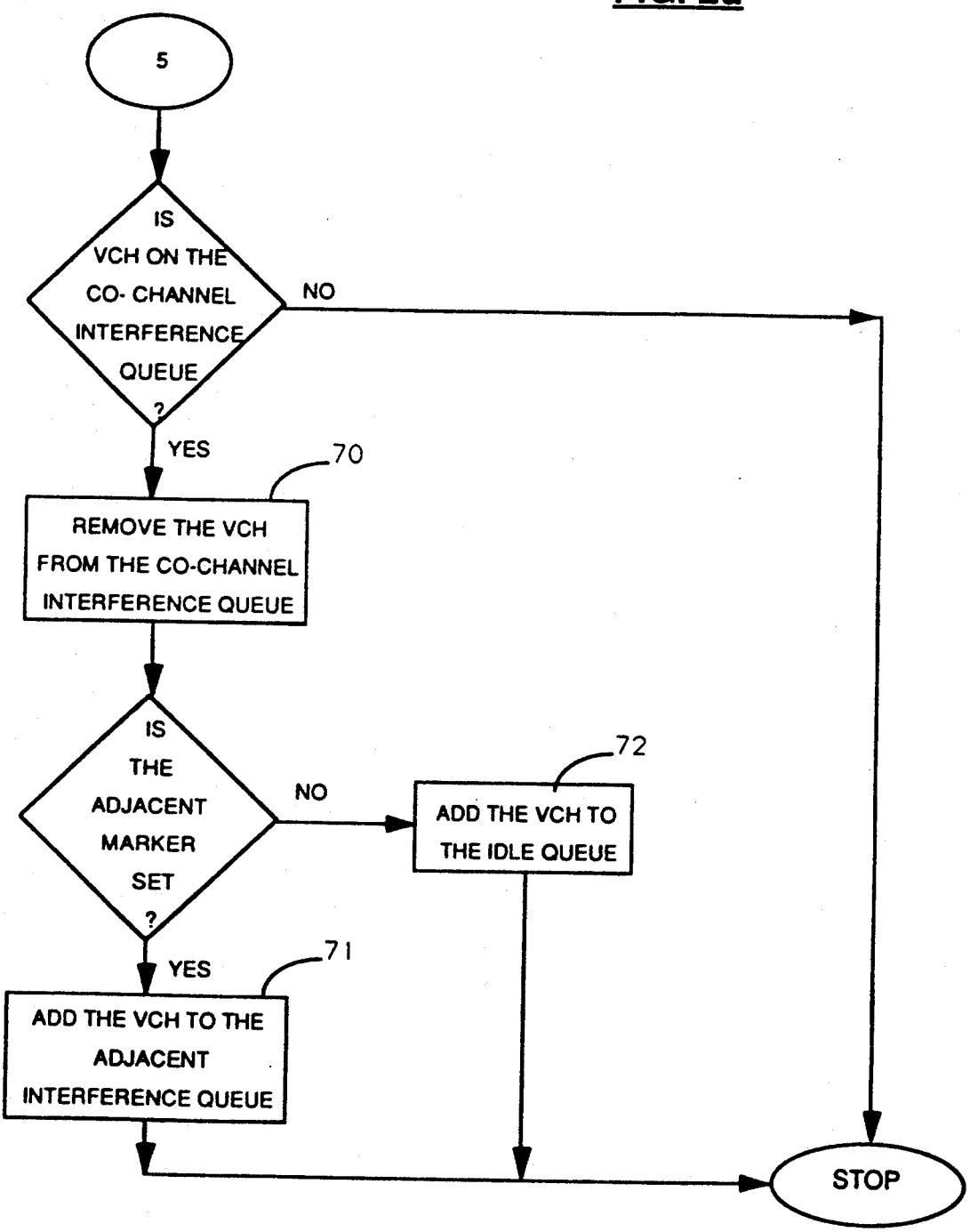

In FIG. 2d, when a co-channel idle message is received, if a voice channel is on the co-channel interference queue, it is removed therefrom 70. If the adjacent marker is set, the voice channel is added 71 to the adjacent interference queue. If there is no adjacent marker, the voice channel is added 72 to the idle queue.

Figure 3:
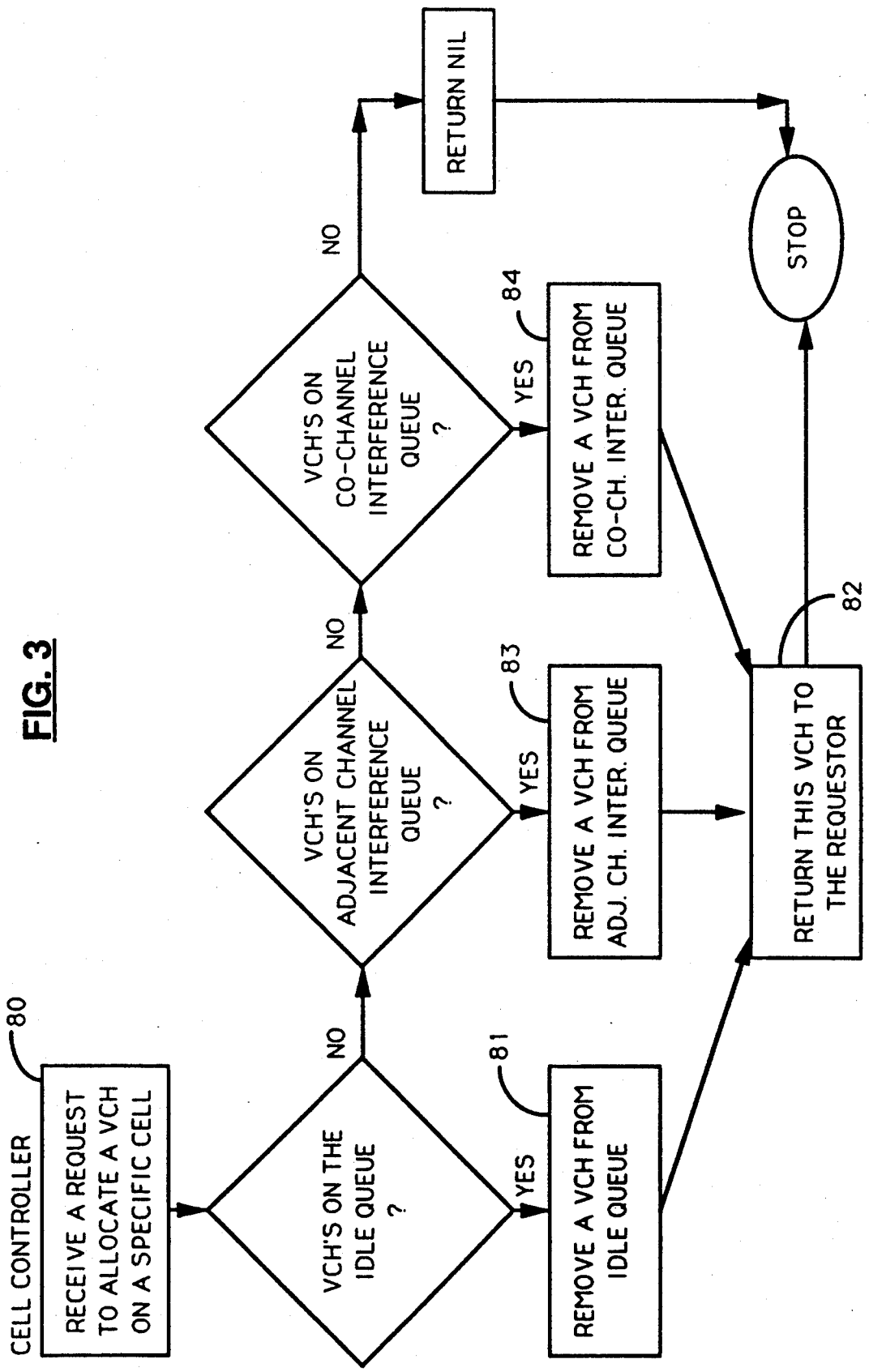
FIG. 3 is a flowchart illustrating the channel priority allocating algorithm for the cell controller.

Since co-channel interference causes more serious degradation of the signal than adjacent channel interference, voice channels reporting the possibility of adjacent channel interference will be chosen to service mobiles before a voice channel reporting the possibility of co-channel interference. FIG. 3 illustrates the channel priority allocating algorithm 80. Selection priority will be given initially to voice channels on the idle queue, i.e. those that do not report the possibility of interference. Those channels will be removed 81 from the idle queue and provided 82 to the requestor. If no voice channels are available on the idle queue, then a voice channel will be selected from the adjacent channel interference queue, if any are available. This VCH will be removed 83 from the queue and provided 82 to the requestor.

Finally, if the only remaining channels are in the co-channel interference queue, then one VCH will be removed 84 therefrom and provided 82 to the requestor.

What is claimed is:

1. A method of allocating voice channels stored in an idle queue so as to minimize co-channel and adjacent channel interference, the method comprising the steps of:

a) monitoring at a base station an idle voice channel stored in said idle queue;

b) measuring at the base station the RSSI level of the idle voice channel and on channels adjacent the idle voice channel;

c) sending an idle voice message from the base station to a cell controller if the RSSI level is less than a threshold T1, indicating that the idle voice channel can be allocated;

d) sending a noise message to said cell controller if noise having an RSSI level greater than or equal to the threshold T1 is detected, indicating that the idle voice channel cannot be allocated;

e) storing the idle voice channel in a co-channel interference queue if noise having a RSSI level greater than or equal to the threshold T1 was measured on a co-channel;

f) storing the idle voice channel in an adjacent channel interference queue if noise having a RSSI level greater than or equal to the threshold T1 was measured on an adjacent channel; and g) holding said idle voice channel in either of said co-channel or adjacent channel interferences queues until the RSSI level measured on the channel is less than the threshold T1.

2. The method recited in claim 1, further comprising the step of incrementing RSSI levels associated with each idle voice channel being monitored.

3. The method recited in claim 1, wherein a voice channel from the adjacent channel interference queue will be selected before a voice channel from the co-channel interference queue when a request for a voice channel is received, if no voice channels are available from the idle queue.

4. The method recited in claim 1, comprising the step of returning the idle voice channel, stored in either one of said co-channel or adjacent channel interference queues, to the idle queue when the monitored RSSI level of the idle voice channel decreases below the threshold T1.

5. The method recited in claim 4, wherein the selection priority of voice channels will be given to those in the adjacent-channel interference queue if none are available in the idle queue and to the co-channel interference queue if none are available in either of the idle queue or the adjacent interference queue.

* * * * *